US008189987B2

(12) United States Patent
Choi et al.

(10) Patent No.: US 8,189,987 B2
(45) Date of Patent: May 29, 2012

(54) DIGITAL MULTIMEDIA REPRODUCING APPARATUS AND METHOD OF PROVIDING DIGITAL MULTIMEDIA BROADCASTING IN THE DIGITAL MULTIMEDIA REPRODUCING APPARATUS

(75) Inventors: Hyun-seok Choi, Seoul (KR); Han-sub Park, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1535 days.

(21) Appl. No.: 11/638,375

(22) Filed: Dec. 14, 2006

(65) Prior Publication Data

US 2007/0189713 A1 Aug. 16, 2007

(30) Foreign Application Priority Data

Dec. 20, 2005 (KR) ........................ 10-2005-0126266

(51) Int. Cl.
*H04N 5/765* (2006.01)
*H04N 5/935* (2006.01)
*H04N 5/917* (2006.01)

(52) U.S. Cl. .......................... 386/200; 386/214; 386/329

(58) Field of Classification Search .................. 386/200, 386/213, 214, 216, 231, 329
See application file for complete search history.

(56) References Cited

U.S. PATENT DOCUMENTS 6,467,093 B1 * 10/2002 Inoue et al. ................... 725/151
2005/0060744 A1 3/2005 Kim et al.
2006/0013310 A1 * 1/2006 Lee et al. ................. 375/240.16
2006/0034337 A1 * 2/2006 Ryu et al. ....................... 370/503
2006/0166616 A1 * 7/2006 Kwak et al. .................. 455/3.01
2007/0025472 A1 * 2/2007 Hamaminato ................ 375/324
2007/0064821 A1 * 3/2007 Chen et al. .................... 375/260
2007/0126936 A1 * 6/2007 Fujihira et al. ................ 348/729
2007/0183744 A1 8/2007 Koizumi et al.

FOREIGN PATENT DOCUMENTS

CN 1491034 4/2004
CN 1152561 6/2004
CN 1574920 2/2005
CN 1684523 10/2005

OTHER PUBLICATIONS

Kim, Jae-Hyun et al., *Implementation of Chipset for a Digital Multimedia Broadcasting Receiver*, IEEE, Jan. 8, 2005, pp. 331-332.
Koo, Bontae et al., *Implementation of Baseband Chip for the Terrestrial Digital Multimedia Broadcasting (T-DMB) System*, IEEE, Jan. 8, 2005, pp. 471-474.
Lee, S.K. et al., *Video for Mobile and Handheld Devices: Design and Implementation of the Korean T-DMB System*, International Broadcasting Conference, Sep. 10-14, 2004 (8 pp.).
Extended European Search Report, mailed Nov. 4, 2010, in corresponding European Application 06126168.1 (10 pp.).

* cited by examiner

*Primary Examiner* — Robert Chevalier
(74) *Attorney, Agent, or Firm* — Staas & Halsey LLP

(57) ABSTRACT

A digital multimedia reproducing apparatus capable of receiving and providing digital multimedia broadcasting (DMB) in addition to reproducing moving pictures and music, and a DMB providing method performed in the digital multimedia reproducing apparatus, the digital multimedia reproducing apparatus including: a tuner unit to receive a digital broadcasting signal via a predetermined channel; a channel decoding unit to convert the digital broadcasting signal received from the tuner unit into a digital signal and to produce an MPEG-2 transmission stream therefrom; a decoding unit to demultiplex the MPEG-2 transmission stream to extract video data and audio data and H.264-decode the video data; and a control unit to decode the extracted audio data using bit-sliced arithmetic coding (BSAC) software and to control the decoded audio data and the video data to be output.

48 Claims, 5 Drawing Sheets

DIGITAL MULTIMEDIA REPRODUCING APPARATUS AND METHOD OF PROVIDING DIGITAL MULTIMEDIA BROADCASTING IN THE DIGITAL MULTIMEDIA REPRODUCING APPARATUS

CROSS-REFERENCE TO RELATED APPLICATION

This application claims the benefit of Korean Patent Application No. 2005-126266, filed on Dec. 20, 2005, in the Korean Intellectual Property Office, the disclosure of which is incorporated herein by reference.

BACKGROUND OF THE INVENTION

1. Field of the Invention

Aspects of the present invention relate to a digital multimedia reproducing apparatus capable of receiving and providing digital multimedia broadcasting (DMB) in addition to reproducing moving pictures and music, and a DMB providing method performed in the digital multimedia reproducing apparatus.

2. Description of the Related Art

Digital audio broadcasting (DAB) provides not only a CD-level high-quality audio service, but also various additional data services, such as weather, traffic, entertainment, and images, by using a latest speech encoding method that provides a high compression rate. Eureka-147 DAB, which is used in Europe, provides a CD-level audio service and various additional data services by using a high-quality audio compression technique based on a Moving Picture Experts Group (MPEG) audio layer II. Digital multimedia broadcasting (DMB) is digital broadcasting that is upgraded from DAB. DMB provide audio broadcasting, video broadcasting, and data broadcasting all together.

With the start of DMB via terrestrial waves, a digital multimedia reproducing apparatus capable of reproducing various digital multimedia contents needs to include a DMB receiving function for the convenience of users who want to receive or use digital multimedia contents.

SUMMARY OF THE INVENTION

Aspects of the present invention provide a digital multimedia reproducing apparatus capable of receiving and providing digital multimedia broadcasting (DMB) in addition to reproducing moving pictures and music, and a DMB providing method performed in the digital multimedia reproducing apparatus.

Aspects of the present invention also provide a digital multimedia reproducing apparatus capable of recording received DMB, and a DMB recording method performed in the digital multimedia reproducing apparatus.

Aspects of the present invention also provide a digital multimedia reproducing apparatus capable of reproducing recorded DMB, and a DMB reproducing method performed in the digital multimedia reproducing apparatus.

According to an aspect of the present invention, there is provided a digital multimedia reproducing apparatus providing digital broadcasting, the apparatus including: a tuner unit to receive a digital broadcasting signal via a predetermined channel; a channel decoding unit to convert the digital broadcasting signal received from the tuner unit into a digital signal and to perform OFDM demodulation, Viterbi decoding, and Reed Solomon decoding on the digital signal so as to produce an MPEG-2 transmission stream; a decoding unit to demultiplex the MPEG-2 transmission stream to extract video data and audio data and H.264-decoding the video data; and a control unit to decode the extracted audio data using bit-sliced arithmetic coding (BSAC) software and to control the decoded audio data and the video data to be output.

The tuner unit may convert the digital broadcasting signal received in the form of a radio frequency (RF) signal into an intermediate frequency (IF) signal and the channel decoding unit may comprise: an analog-to-digital converter to convert the IF signal into the digital signal; an OFDM demodulator to demodulate the digital signal according to an OFDM way and to output a fast information channel (FIC) and a main service channel (MSC); a time deinterleaver to perofrm time deinterleaving on the MSC; a Viterbi decoder to perform Viterbi decoding on the signal output by the time deinterleaver; a convolution deinterleaver to perform convolution deinterleaving on the Viterbi decoded signal; and a Reed Solomon decoder to perform Reed Solomon decoding on the convolutional deinterleaved signal and to output the MPEG-2

The decoding unit may include: an MPEG-2 demultiplexer to demultiplex the MPEG-2 transmission stream to extract the video data and the audio data; a H.264 decoder to perform H.264 decoding on the video data; a post to convert a format of the decoded video data into a YUV format; a display to control transmitting the video data in the YUV format to the control unit; an internal memory to store data to be processed by the MPEG-2 demultiplexer, the H.264 decoder, the post, and the display controller; and a direct memory access (DMA) to control accesses of the MPEG-2 demultiplexer, the H.264 decoder, the post, and the display controller to the internal memory.

The control unit may include: a BSAC software decoder to decode the audio data using BSAC software; a video interface to receive the video data from the decoding unit and to convert a format of the video data into an RGB format; and an LCD controller to control the video data in the RGB format to be displayed.

The control unit may further include: a tuner/channel controller to control the tuner unit and the channel decoding unit; a H.264 controller to control the H.264 decoder included in the decoding unit; a TS controller to control the MPEG-2 transmission stream; a system controller to control the whole of a system of the digital multimedia reproducing apparatus; a media decoder to decode at least one of an MPEG-4 file, a WMV file, and a DIVX file; a memory traffic controller to control accesses of the BSAC software decoder, the tuner/channel controller, the H.264 controller, the TS controller, and the system controller to the storage unit; and a host port interface bridge (HPIB) controller to provide an interface between the media decoder and components of the control unit other than the media decoder.

The digital multimedia reproducing apparatus may further include a display unit to display video data output by the LCD controller, and an audio output unit to output the decoded audio data, wherein the audio output unit may include an audio codec to convert the audio data into an analog signal, and a speaker to amplify the audio data and to output the amplified audio data.

The digital multimedia reproducing apparatus may further include a communications line control unit comprising a USB controller to control an external device connected via a communications line, such as a USB, such that the control unit may control the communications line control unit to send a file stored in a storage unit to the external device or to receive a file from the external device to store the file in the storage unit.

The digital multimedia reproducing apparatus may further include a video input/output unit to output the video data stored in the storage unit or to receive video and/or audio data reproduced by an external apparatus connected via a line-in cable, wherein the controller may control the video and/or audio data received via the video input/output unit to be stored in the storage unit.

According to another aspect of the present invention, there is provided a digital multimedia reproducing apparatus recording digital broadcasting, the apparatus including: a tuner unit to receive a digital broadcasting signal via a predetermined channel; a channel decoding unit to convert a digital broadcasting signal received from the tuner unit into a digital signal and to perform OFDM demodulation, Viterbi decoding, and Reed Solomon decoding on the digital signal so as to produce an MPEG-2 transmission stream; a decoding unit to receive the MPEG-2 transmission stream and to store the MPEG-2 transmission stream in an internal memory; a control unit to transmit the MPEG-2 transmission stream stored in the internal memory to a storage unit; and the storage unit to store the received MPEG-2 transmission stream.

According to another aspect of the present invention, there is provided a digital multimedia reproducing apparatus reproducing recorded digital broadcasting, the apparatus comprising: a storage unit to store a digital broadcasting signal in the form of an MPEG-2 transmission stream; a decoding unit to demultiplex the MPEG-2 transmission stream read out of the storage unit to extract video data and audio data and to H.264 -decode the video data; a control unit to decode the extracted audio data using bit-sliced arithmetic coding (BSAC) software and to control the decoded audio data and the video data to be output; a display unit to display the video data; and an audio output unit to output the decoded audio data.

According to another aspect of the present invention, there is provided a method of providing digital broadcasting, the method comprising: receiving a user input signal that requests the digital broadcasting; receiving a digital broadcasting signal via a predetermined channel; converting the received digital broadcasting signal into a digital signal and performing OFDM demodulation, Viterbi decoding, and Reed Solomon decoding on the digital signal to thereby produce an MPEG-2 transmission stream; demultiplexing the MPEG-2 transmission stream to extract video data and audio data and H.264 -decoding the video data; decoding the extracted audio data using BSAC software; and outputting the decoded audio data and the decoded video data.

According to another aspect of the present invention, there is provided a method of recording digital broadcasting, the method comprising: receiving a user input signal that requests recording of the digital broadcasting; receiving a digital broadcasting signal via a predetermined channel; converting the received digital broadcasting signal into a digital signal and performing OFDM demodulation, Viterbi decoding, and Reed Solomon decoding on the digital signal to thereby produce an MPEG-2 transmission stream; receiving the MPEG-2 transmission stream and storing the MPEG-2 transmission stream in an internal memory; transmitting the MPEG-2 transmission stream stored in the internal memory to a storage unit; and storing the MPEG-2 transmission stream in the storage unit.

According to another aspect of the present invention, there is provided a method of reproducing digital broadcasting, the method comprising: receiving a user input signal that requests a reproduction of a recorded digital broadcasting signal; reading out a digital broadcasting signal stored in the form of an MPEG-2 transmission stream; demultiplexing the read-out MPEG-2 transmission stream to extract video data and audio data and H.264 -decoding the video data; decoding the audio data using BSAC software; and outputting the decoded audio data and the decoded video data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
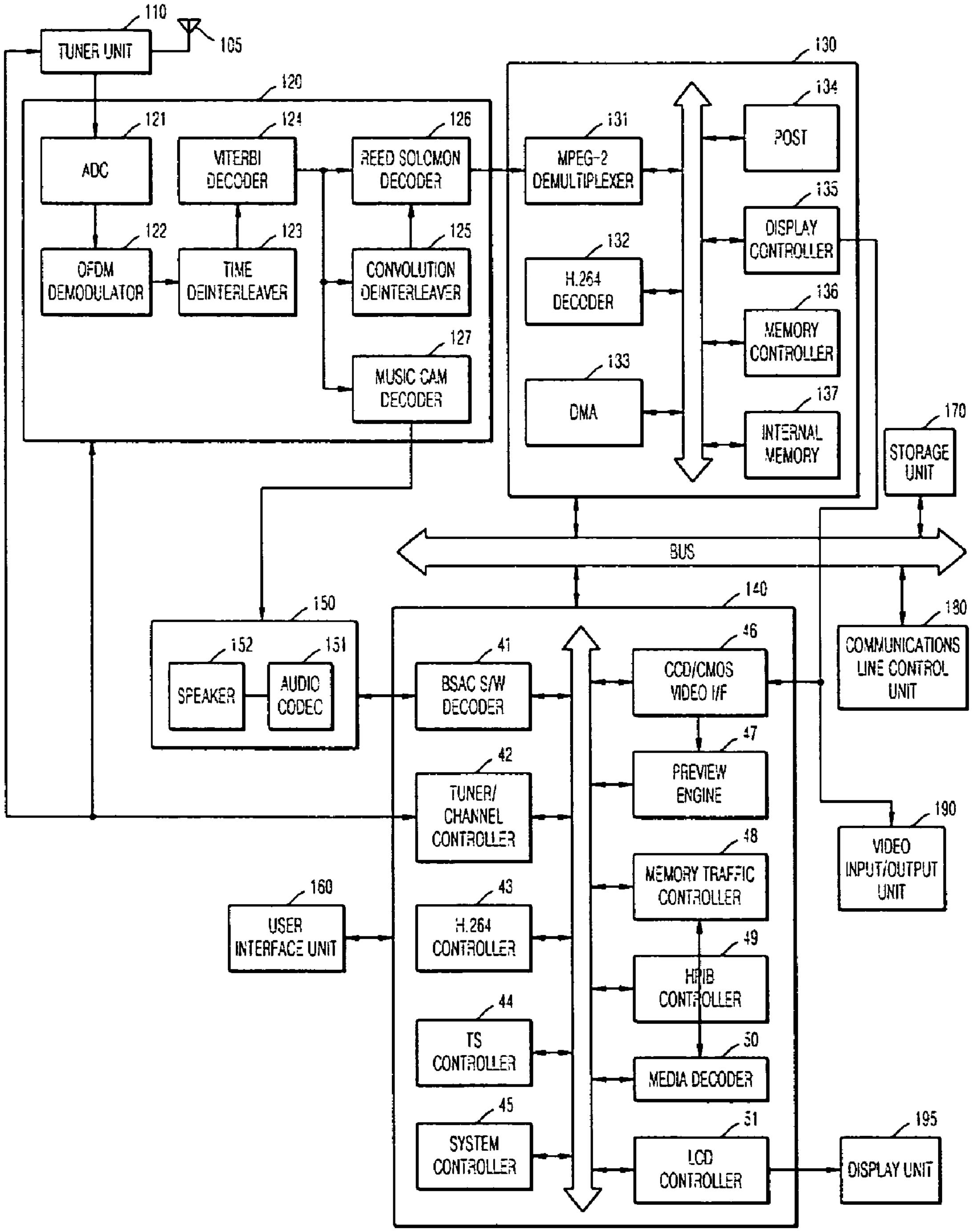
FIG. 1 is a block diagram illustrating an internal structure of a digital multimedia reproducing apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 5:
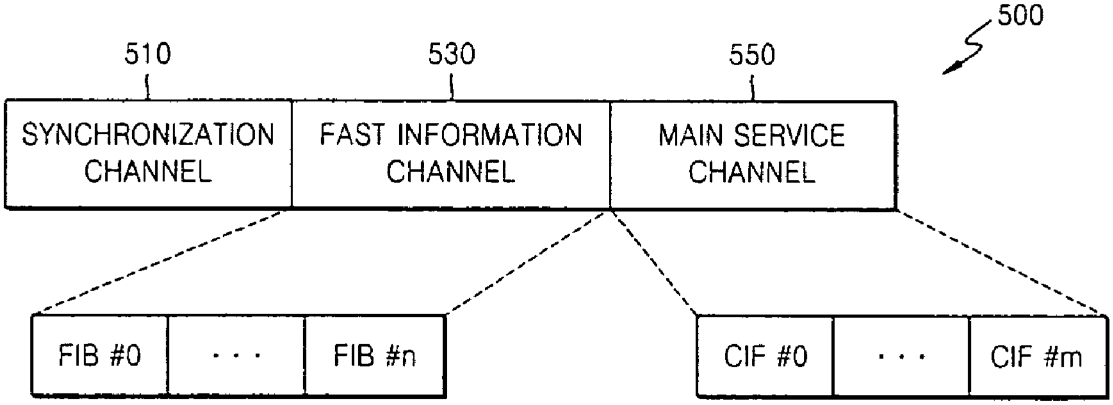
FIG. 5 is a block diagram illustrating a structure of a DMB transmission frame according to an embodiment of the present invention.

A structure of a digital multimedia broadcasting (DMB) transmission frame 500 according to an embodiment of the present invention will now be described with reference to FIG. 5. Referring to FIG. 5, the DMB transmission frame 500 includes a synchronization channel (SC) 510, a fast information channel (FIC) 530, and a main service channel (MSC) 550.

The SC 510 includes a null symbol used to determine a transmission mode, and a reference symbol necessary for orthogonal frequency division multiplexing (OFDM) symbol synchronization and carrier wave frequency synchronization.

The FIC 530 is used to transmit information needed for a receiver to process data (such as information about a service construction, a multiplex configuration, and the like) or to fast transmit data. The FIC 530 includes, for example, multiplex configuration information (MCI) containing information about structures of sub-channels, and service information (SI), which is additional information about each service. Accordingly, the FIC 530 can inform what service data should be transmitted through the MSC and what application should use the service. The FIC 530 further includes a fast information data channel (FIDC) that includes data to be fast transmitted within a predetermined period of time. For example, the FIDC includes simple messages for emergencies.

The FIC 530 also includes a plurality of fast information blocks (FIBs). Each of the FIBs includes an FIB data field and a CRC field. The FIB data field includes fast information groups (FIGs). In each FIG, an FIG type field, which indicates the format of data contained in the FIG data field, and a length field, which indicates the length of the FIG data field, are inserted into a header portion of the FIG, and actual data are added to the next portion of the FIG data field.

The MSC 550 transmits real contents data provided by a service provider. The MSC 550 may include a part of FIC data when the space of the FIC 530 is insufficient. However, according to an aspect, since the MSC 550 employs time interleaving, which may result in more or less delay time required for decoding, the MSC 550 cannot contain FIC data to be fast transmitted. The data transmitting system can be classified into a stream mode and a packet mode. The MSC 550 includes a plurality of frames called common interleaved frames (CIFs).

FIG. 1 is a block diagram illustrating an internal structure of a digital multimedia reproducing apparatus according to an embodiment of the present invention. Referring to FIG. 1, the digital multimedia reproducing apparatus includes an antenna 105, a tuner unit 110, a channel decoding unit 120, a decoding unit 130, a control unit 140, an audio output unit 150, a user interface unit 160, a storage unit 170, a communications line control unit 180, a video input/output unit 190, and a display unit 195.

The tuner unit 110 transforms a terrestrial wave band III (i.e., 174-216 MHz) RF signal into an intermediate frequency (IF) signal (i.e., 38.736 MHz or 2.048 MHz).

The channel decoding unit 120 transforms a digital broadcasting signal received from the tuner unit 110 into a digital signal and executes OFDM demodulation, Viterbi decoding, and Reed Solomon decoding on the digital signal to thereby produce an MPEG-2 transmission stream. The channel decoding unit 120 includes an analog-to-digital converter (ADC) 121, an OFDM demodulator 122, a time deinterleaver 123, a Viterbi decoder 124, a convolution deinterleaver 125, a Reed Solomon decoder 126, and a music cam decoder 127.

The ADC 121 converts the IF signal into the digital signal. The OFDM demodulator 122 demultiplexes a signal modulated according to an OFDM way and outputs an FIC and an MSC from an OFDM frame. The time deinterleaver 123 descrambles a time-scrambled signal that is applied to the MSC so as to enhance the efficiency of error correction. Then, unequal error protection (UEP) or equal error protection (EEP) is executed on each of the sub-channels included in the MSC. The Viterbi decoder 124 performs Viterbi decoding that corresponds to a convolutionary error correction code. The convolution deinterleaver 125 performs convolution deinterleaving on the Viterbi decoded broadcasting signal. The Reed Solomon decoder 126 performs RS decoding which is applied to a DMB service. In case of DAB services, the music cam decoder 127 performs music cam (which is a layer 2 of MPEG I and II) decoding, which is a DAB broadcasting source coding method.

Although not shown, the channel decoding unit may further include an IF processor between the ADC 121 and the OFDM demodulator 122. The IF processor processes the IF signal and recovers a distortion, such as a phase shift generated in the digital multimedia broadcasting signal received in the OFDM way.

The decoding unit 130 extracts video data and/or audio data from the MPEG-2 transmission stream by demultiplexing the MPEG-2 transmission stream, and/or performs H.264 decoding on the video data. The decoding unit 130 includes an MPEG-2 demultiplexer 131, an H.264 decoder 132, a direct memory access (DMA) 133, a post 134, a display controller 135, a memory controller 136, and an internal memory 137.

The MPEG-2 demultiplexer 131 demultiplexes the MPEG-2 transmission stream received from the channel decoding unit 120 and transmits an audio source compressed by bit-sliced arithmetic coding (BSAC) to the control unit 140 and/or a video source compressed with H.264 to the H.264 decoder 132. The H.264 decoder 132 decodes the H.264 video source, which is a DMB video. A parser included in the H.264 decoder 132 parses FIC data and transmits multiplex configuration information (MCI) and service information (SI) to the control unit 140. The DMA 133 controls memory access when a component of the decoding unit 130 stores data to the internal memory 137 or reads data from the internal memory 137. The post 134 converts a moving picture of the DMB into a YUV format and magnifies or reduces the screen as needed. Although not shown, the decoding unit 130 may further include a rotator which processes a rotation of the DMB moving picture. Hence, to decode data compressed into an H.264 format, related information, such as a header, is first interpreted. Then, the decoding is actually performed based on the interpreted information and when the decoding is completed, a change of the format of the screen and magnification/reduction of the format are, for example, performed in the post 134. To quickly execute the operation with respect to the video data, pipelining, which is a software method, may be used. The display controller 135 transmits the posted moving image to the control unit 140. The memory controller 136, serving as an interface between a local bus of the decoding unit 130 and a bus of the internal memory 137, performs a formatting change so as to achieve data reading and data writing between the two buses. The internal memory 137 is a memory in which each of the components of the decoding unit 130 stores data and from which each of the components reads data.

The control unit 140 controls the whole of the digital multimedia reproducing apparatus, decodes the extracted audio data using BSAC software, and controls the output of the decoded audio data and the video data. To achieve these operations, the control unit 140 includes a BASC S/W decoder 41, a tuner/channel controller 42, an H.264 controller 43, a TS controller 44, a system controller 45, a CCD/CMOS video I/F 46, a preview engine 47, a memory traffic controller 48, a host port interface bridge (HPIB) controller 49, a media decoder 50, and an LCD controller 51. The BASC S/W decoder 41, the tuner/channel controller 42, the H.264 controller 43, the TS controller 44, and the system controller 45 may be integrated into a single CPU chip.

The BASC S/W decoder 41 decodes a BSAC audio source received from the channel decoding unit 120, using software. The tuner/channel controller 42 controls the tuner unit 110 and the channel decoding unit 120 using an 120 communication way with reference to the MCI and SI received from the decoding unit 130. The H.264 controller 43 controls the H.264 decoder 132. The TS controller 44 controls an enable/disable operation of the MPEG-2 TS demultiplexer 131. When the transmission stream is divided into audio data and video data, the TS controller 44 designates an address of the internal memory 137 where the audio data and the video data are to be stored. The system controller 45 controls the whole of the digital multimedia reproducing apparatus. The CCD/CMOS video I/F 46 receives the video data transmitted by the decoding unit 130, via a CCD interface. The preview engine 47 adjusts the size of the screen so as to display the video data received from the CCD/CMOS video I/F 46 on the display unit 195. In case of a DMB signal, the adjustment of the screen size is performed by the post 134. The memory traffic controller 48 controls an access of the CPU chip to several memory blocks included in the storage unit 170. The HPIB controller 49 serves as an interface between the CPU chip and the media decoder 50. The media decoder 50 decodes an MPEG-4 file, a WMV file, and a DIVX file. The LCD controller 51 controls the display unit 195 to output and display the video data.

The audio output unit 150 includes an audio codec 151 to convert a digital signal into an audio signal, and a speaker 152, although not necessarily. The audio output unit 150 may further include an earphone and a microphone that is able to receive an external audio input. Based on a speech recording request signal received from the user interface unit 160, the control unit 140 controls the audio codec 151 to convert a speech signal received via the microphone into a digital signal and the storage unit 170 to store the digital signal so that a speech is recorded.

The user interface unit 160 includes, for example, a keypad and receives a user input signal, such as a digital broadcasting request signal. The keypad includes, for example, an up-down-left-right movement button, a selection (OK) button, a play/pause button, a record button, a tool button, a menu button, etc. so that a user manipulates the digital multimedia reproducing apparatus using these function buttons. However, it is understood that other devices or methods, such as a touch screen on the display unit or a rotatable dial, may be used to receive the user input signal.

The storage unit 170 may include a hard disc drive, a flash memory, and/or an SDRAM. A digital broadcasting signal may be stored in the form of an MPEG-2 transmission stream.

The communications line control unit 180 includes a USB controller to control a USB device connected via a communications line, such as a USB. In the digital multimedia reproducing apparatus, the control unit 140 can control the communications line control unit 180 to send a file stored in the storage unit 170 to an external apparatus and to receive a file from the external apparatus to store the file in the storage unit 170. The file received from the external apparatus may be stored in a specific folder of the storage unit 170 (for example, in an "Imported" folder). It is understood that the communications line control unit 180 may send and/or receive files and data by other methods, such as Bluetooth and/or infrared.

The video input/output unit 190 transmits and receives multimedia contents to and from an external apparatus connected via a, for example, line-in cable. The external apparatus may be a cassette player, a CD player, or a camcorder. In the digital multimedia reproducing apparatus, the control unit 140 can control stored image and speech data to be output to an external apparatus connected to the video input/output unit 190, and image and/or audio data reproduced in the external apparatus can be stored in the storage unit 170 via the video input/output unit 190.

The display unit 195 outputs a decoded video signal and/or other displayable data or content under the control of the control unit 140. The display unit 195 may include an interface through which the display unit 195 is linked with the control unit 140, and a, for example, 4-inch LCD.

When a digital audio broadcasting (DAB) signal among digital broadcasting signals is received, the DAB signal is converted into an IF signal by the tuner unit 110, the IF signal is converted into a digital signal by the channel decoding unit 120, and the digital signal is subject to OFDM demodulation, time deinterleaving, and Viterbi decoding and then MPEG-2 decoded by the music cam decoder 127. Thereafter, the MPEG-2 decoded signal can be output to the speaker 152 via the audio codec 151.

In the digital multimedia reproducing apparatus, the control unit 140 reads out various digital multimedia contents stored in the storage unit 170, decodes the contents using the media decoder 50, and provides the decoded contents to the audio output unit 150 and/or the display unit 195, thereby reproducing various multimedia contents. The digital multimedia contents may include videos, audios, still images, texts, etc.

Figure 2:
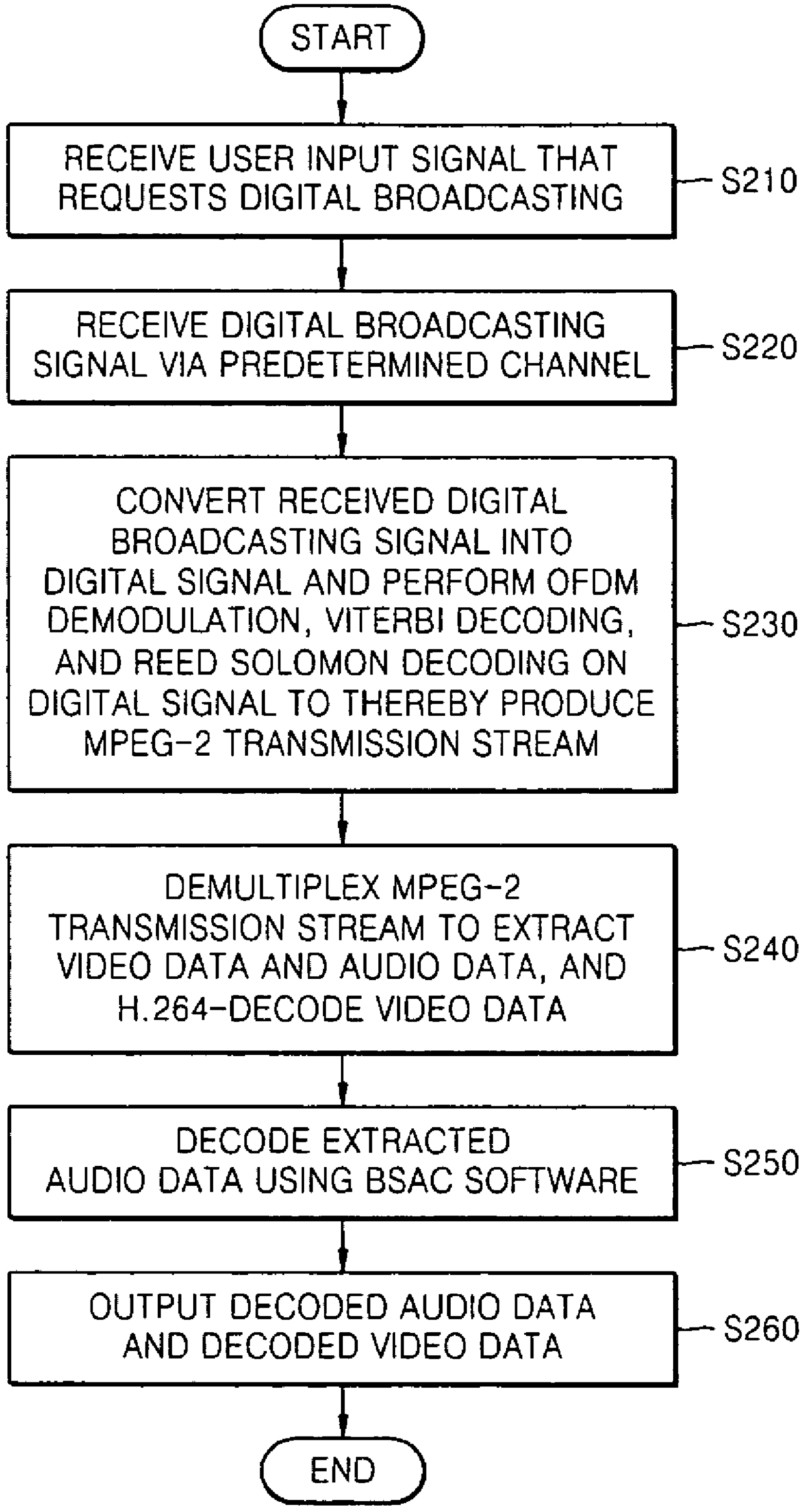
FIG. 2 is a flowchart illustrating a method in which the digital multimedia reproducing apparatus of FIG. 1 receives and provides digital multimedia broadcasting (DMB)

A process in which the digital multimedia reproducing apparatus of FIG. 1 receives and provides DMB, records the DMB, and reproduces the recorded DMB will now be described with reference to FIG. 2. FIG. 2 is a flowchart illustrating a method in which the digital multimedia reproducing apparatus of FIG. 1 receives and provides DMB.

When a user input signal that requests digital broadcasting is received via the user interface unit 160 in operation S210, the control unit 140 initializes the tuner unit 110, the channel decoding unit 120, and the decoding unit 130, each of which can be configured into a chip set. Thereafter, in operation S220, the control unit 140 controls the tuner unit 110 to receive the digital broadcasting via a predetermined channel. Also, in operation S230, the control unit 140 controls the channel decoding unit 120 to convert a digital broadcasting signal received from the tuner unit 110 into a digital signal and perform OFDM demodulation, Viterbi decoding, and/or Reed Solomon decoding on the digital signal to thereby produce an MPEG-2 transmission stream.

In operation S240, the decoding unit 130 demultiplexes the MPEG-2 transmission stream to extract video data and/or audio data, and H.264 -decodes the video data. In operation S250, the control unit 140 decodes the audio data extracted by the decoding unit 130 using, for example, BSAC software. In operation S260, the control unit 140 outputs the audio data to the audio output unit 150 and/or the video data to the display unit 195.

When a user input signal that requests a channel change is received via the user interface unit 160 while DMB is being received, the control unit 140 can control the tuner unit 110, the channel decoding unit 120, and the decoding unit 130 to provide digital broadcasting received via a changed channel, based on the user input signal, to users through the audio output unit 150 and/or the display unit 195.

The digital multimedia reproducing apparatus can provide various tool menus (such as a channel re-search, a channel mode, and a capture) to users while the DMB is being provided to the users. When a tool menu request signal is received via the user interface unit 160 while DMB is being provided, the control unit 40 provides a requested tool menu to the display unit 195.

When a channel re-search request signal is received via the user interface unit 160, for example, the control unit 140 controls the tuner unit 10, the channel decoding unit 120, and the decoding unit 130 to re-search and store a list of DMB channels while providing the DMB of a selected channel. When a channel mode search request signal is received via the user interface unit 160, the control unit 140 can provide a channel mode setting menu to the display unit 195. A user can search for only video channels by selecting a video channel from the channel mode setting menu, search for only audio channels by selecting an audio channel from the channel mode setting menu, search for only data channels by selecting a data channel from the channel mode setting menu, or search for a combination thereof (such as a search for only video and data channels). When a capture is selected from among tool menus through the user interface unit 160, the control unit 140 can control a video screen being provided to be captured and a desired scene to be stored as a file (such as a JPEG file) in a folder named "captured" of the storage unit 170. It is understood that according to other aspects, the control unit 140 can control a capture of a portion of the video and/or audio and store the captured portion as a file (such as an MPEG file).

Figure 3:
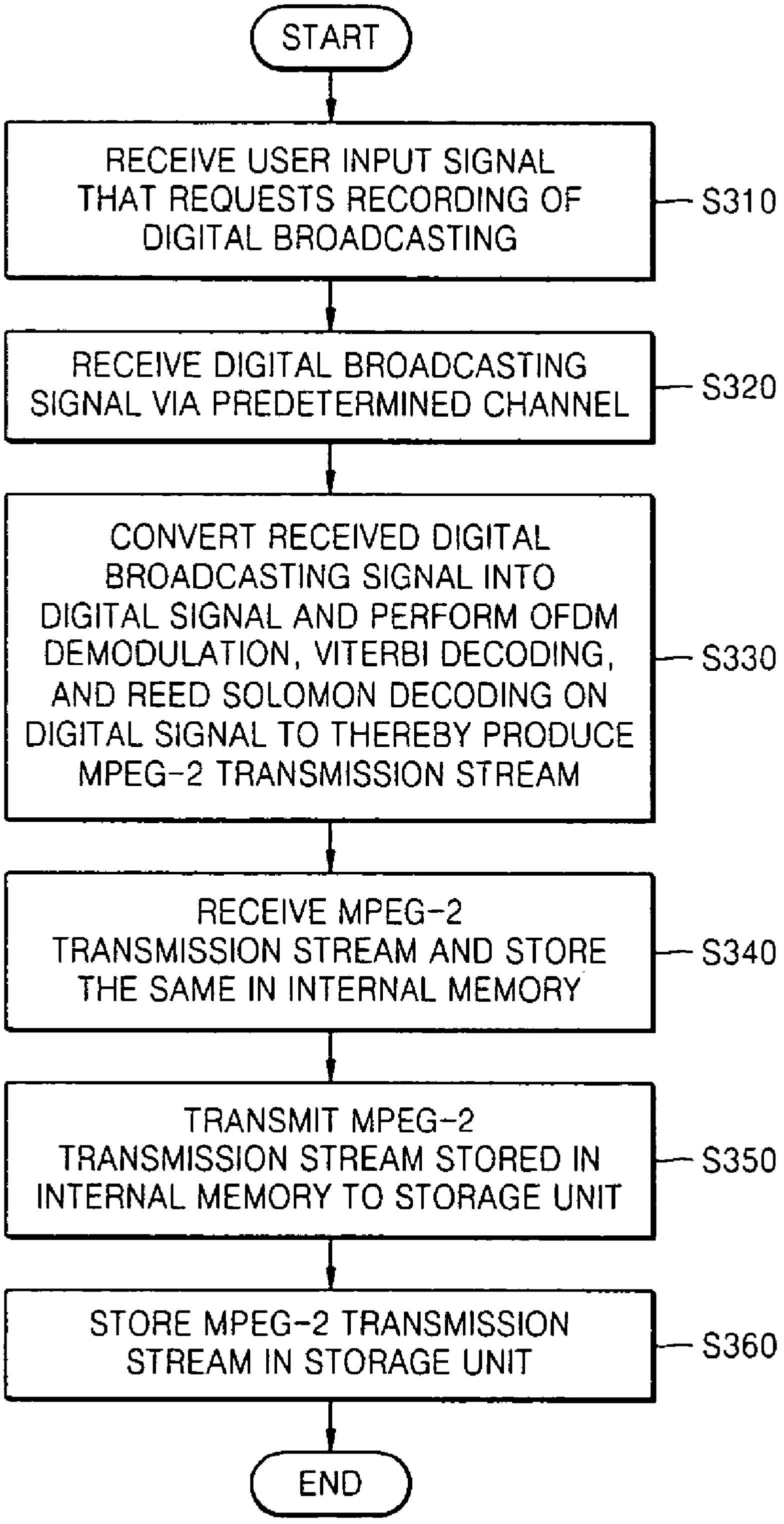
FIG. 3 is a flowchart illustrating a method in which the digital multimedia reproducing apparatus of FIG. 1 records DMB.

FIG. 3 is a flowchart illustrating a method in which the digital multimedia reproducing apparatus of FIG. 1 records DMB. Referring to FIG. 3, when a user inputs a digital broadcasting recording request signal via the user interface unit 160 in operation S310, the control unit 140 controls the tuner unit 10 to receive a digital broadcasting signal via a predetermined channel in operation S320. In operation S330, the control unit 140 controls the decoding unit 130 to convert the digital broadcasting signal received from the tuner unit 110 into a digital signal and perform OFDM demodulation, Viterbi decoding, and/or Reed Solomon decoding on the digital signal to thereby produce an MPEG-2 transmission stream.

Thereafter, in operation S340, the decoding unit 130 receives the MPEG-2 transmission stream and stores the same in the internal memory 137. Then, in operation S350, the control unit 40 accesses the internal memory 137 and transmits the MPEG-2 transmission stream stored in the internal memory 137 to the storage unit 170. In operation S360, the storage unit 170 stores the MPEG-2 transmission stream. During the recording, a recording file name in such a form as, for example, "XXXX_yyyymmddnnn" is automatically designated. Here, "XXXX" denotes a recording type, "yyyy" denotes the year, "mm" denotes the month, and "nnn" denotes a recording number.

Figure 4:
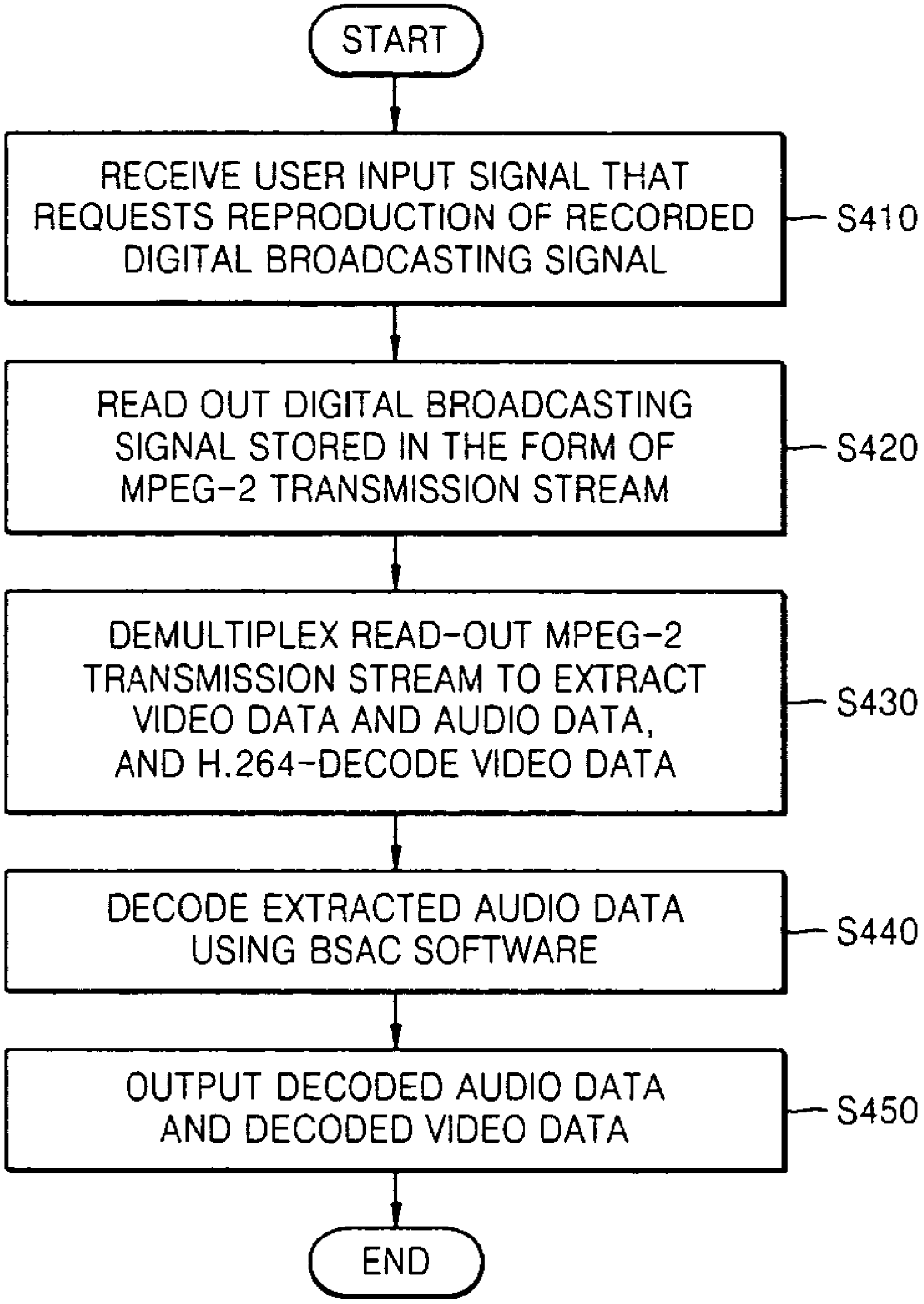
FIG. 4 is a flowchart illustrating a method in which the digital multimedia reproducing apparatus of FIG. 1 reproduces recorded DMB.

FIG. 4 is a flowchart illustrating a method in which the digital multimedia reproducing apparatus of FIG. 1 reproduces recorded DMB. Referring to FIG. 4, when a user input signal that requests a reproduction of a recorded digital broadcasting signal is received via the user interface unit 160 in operation S410, the control unit 140 reads out a digital broadcasting signal stored in the form of, for example, an MPEG-2 transmission stream in the storage unit 170 and transmits the digital broadcasting signal to the decoding unit 130 in operation S420. The control unit 140 controls the decoding unit 130 so that the DMA 133 receives the MPEG-2 transmission stream from the storage unit 170 and transmits the same to the internal memory 137. It is understood that other file types may be reproduced (such as a Windows Media file type) and the stored file may be captured DMB or may be audio or video files transferred wiredly or wirelessly from an external storage device, such as a computer.

In operation S430, the decoding unit 130 demultiplexes the MPEG-2 transmission stream to extract video data and/or audio data, and H.264 -decodes the video data. In operation S440, the control unit 140 decodes the audio data using BSAC software. In operation S450, the control unit 140 outputs the audio data to the audio output unit 150 and/or the video data to the display unit 195.

As described above, aspects of the present invention provide a digital multimedia reproducing apparatus capable of receiving and providing DMB in addition to reproducing moving pictures and music, and a DMB providing method performed in the digital multimedia reproducing apparatus.

Aspects of the present invention also provide a digital multimedia reproducing apparatus capable of recording received DMB, and a DMB recording method performed in the digital multimedia reproducing apparatus.

Aspects of the present invention also provide a digital multimedia reproducing apparatus capable of reproducing recorded DMB, and a DMB reproducing method performed in the digital multimedia reproducing apparatus.

Methods of providing, recording, and reproducing DMB according to aspects of the present invention can also be embodied as computer-readable codes on a computer-readable recording medium. Also, functional programs, codes, and code segments to accomplish aspects of the present invention can be easily construed by programmers skilled in the art to which the present invention pertains. The computer-readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and a computer data signal embodied in a carrier wave comprising a compression source code segment and an encryption source code segment (such as data transmission through the Internet). The computer-readable recording medium can also be distributed over network-coupled computer systems so that the computer-readable code is stored and executed in a distributed fashion.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A digital multimedia reproducing apparatus providing digital broadcasting, the apparatus comprising:
- a tuner unit to receive a digital broadcasting signal via a predetermined channel;
- a channel decoding unit to convert the digital, broadcasting signal received from the tuner unit into a digital signal and to perform OFDM demodulation, Viterbi decoding, and/or Reed Solomon decoding on the digital signal so as to produce an MPEG-2 transmission stream;
- a decoding unit to demultiplex the MPEG-2 transmission stream to extract video data and/or audio data, to decode the extracted audio data using bit-sliced arithmetic coding (BSAC) software, and to H.264-decode the video data; and
- a control unit to decode the extracted audio data and to control the decoded audio data and the video data to be output.

2. The digital multimedia reproducing apparatus as claimed in claim 1, wherein the tuner unit converts the digital broadcasting signal from a radio frequency (RF) signal into an intermediate frequency (IF) signal.

3. The digital multimedia reproducing apparatus as claimed in claim 2, wherein the channel decoding unit comprises:
- an analog-to-digital converter to convert the IF signal into the digital signal;
- an OFDM demodulator to demodulate the digital signal according to an OFDM way and to output a fast information channel (FIC) and a main service channel (MSC);
- a time deinterleaver to perform time deinterleaving on the MSC;
- a Viterbi decoder to perform Viterbi decoding on the signal output by the time deinterleaver;
- a convolution deinterleaver to perform convolution deinterleaving on the Viterbi decoded signal; and
- a Reed Solomon decoder to perform Reed Solomon decoding on the convolutional deinterleaved signal and to output the MPEG-2 transmission stream.

4. The digital multimedia reproducing apparatus as claimed in claim 1, wherein the decoding unit comprises:
- an MPEG-2 demultiplexer to demultiplex the MPEG-2 transmission stream to extract the video data and the audio data;

an H.264 decoder to H.264 decode the video data;

a post to convert a format of the decoded video data into a YUV format;

a display controller to transmit the video data in the YUV format to the control unit;

an internal memory to store the audio data and the video data to be processed by the MPEG-2 demultiplexer, the H.264 decoder, the post, and the display controller; and a direct memory access (DMA) to control access to the internal memory by the MPEG-2demultiplexer, the H.264 decoder, the post, and the display controller.

5. The digital multimedia reproducing apparatus as claimed in claim 1, wherein the control unit comprises:

a BSAC software decoder to decode the audio data using bit-sliced arithmetic coding (BSAC) software;

a video interface to receive the video data from the decoding unit and to convert a format of the video data into an RGB format; and an LCD controller to control an output of the video data in the RGB format.

6. The digital multimedia reproducing apparatus as claimed in claim 5, wherein the decoder comprises an H.264 decoder, and the control unit further comprises:

a tuner/channel controller to control the tuner unit and the channel decoding unit;

an H.264 controller to control the H.264 decoder;

a TS controller to control the MPEG-2 transmission stream;

a system controller to control the digital multimedia reproducing apparatus;

a media decoder to decode at least one of an MPEG-4 file, a WMV file, and a DIVX file;

a memory traffic controller to control access to a storage unit by the BSAC software decoder, the tuner/channel controller, the H.264 controller, the TS controller, and the system controller; and a host port interface bridge (HPIB) to provide an interface for the media decoder.

7. The digital multimedia reproducing apparatus as claimed in claim 5, further comprising:

a display unit to display the video data output by the LCD controller; and an audio output unit to output the decoded audio data, comprising an audio codec to convert the audio data into an analog signal.

8. The digital multimedia reproducing apparatus as claimed in claim 7, wherein the audio output unit further comprises a speaker to amplify the audio data and to output the amplified audio data.

9. The digital multimedia reproducing apparatus as claimed in claim 1, further comprising:

a storage unit to store audio and/or video files; and a communications line control unit to control a connection to an external device, wherein the control unit controls the communications line control unit to send a file stored in the storage unit to the external device or to receive a file from the external device.

10. The digital multimedia reproducing apparatus as claimed in claim 9, wherein the communications line control unit comprises a USB controller to control a USB connection to the external device.

11. The digital multimedia reproducing apparatus as claimed in claim 1, further comprising a video input/output unit to output the video data or to receive video and/or audio data reproduced by an external apparatus.

12. The digital multimedia reproducing apparatus as claimed in claim 11, further comprising a storage unit to store the video and/or audio data received via the video input/output unit.

13. The digital multimedia reproducing apparatus as claimed in claim 1, further comprising:

a storage unit to store video and/or audio files.

14. The digital multimedia reproducing apparatus as claimed in claim 13, wherein the storage unit stores the MPEG-2 transmission stream.

15. A digital multimedia reproducing apparatus recording digital broadcasting, the apparatus comprising:

a tuner unit to receive a digital broadcasting signal via a predetermined channel;

a channel decoding unit to convert the digital broadcasting signal received from the tuner unit into a digital signal and to perform OFDM demodulation, Viterbi decoding, convolution deinterleaving, and/or Reed Solomon decoding on the digital signal so as to produce an MPEG-2transmission stream; and a storage unit to store the MPEG-2 transmission stream;

a control unit to control a transmission of the MPEG-2 transmission stream to the storage unit.

16. The digital multimedia reproducing apparatus as claimed in claim 15, further comprising:

a decoding unit to receive the MPEG-2 transmission stream and to store the MPEG-2 transmission stream in an internal memory, wherein the control unit transmits the MPEG-2 transmission stream stored in the internal memory to the storage unit.

17. The digital multimedia reproducing apparatus as claimed in claim 15, wherein the tuner unit converts the digital broadcasting signal from an RF signal into an IF signal.

18. The digital multimedia reproducing apparatus as claimed in claim 17, wherein the channel decoding unit comprises:

an analog-to-digital converter to convert the IF signal into the digital signal;

an OFDM demodulator to demodulate the digital signal according to an OFDM way and to output a fast information channel (FIC) and a main service channel (MSC);

a time deinterleaver to perform time deinterleaving on the MSC;

a Viterbi decoder to perform Viterbi decoding on the signal output by the time deinterleaver;

a convolution deinterleaver to perform convolution deinterleaving on the Viterbi decoded signal; and a Reed Solomon decoder to perform Reed Solomon decoding on the convolutional deinterleaved signal and to output the MPEG-2 transmission stream.

19. The digital multimedia reproducing apparatus as claimed in claim 15, wherein the control unit comprises:

a tuner/channel controller to control the tuner unit and the channel decoding unit;

a TS controller to control the MPEG-2 transmission stream;

a system controller to control the digital multimedia reproducing apparatus; and a memory traffic controller to control access to the storage unit by the tuner/channel controller, the TS controller, and the system controller.

20. The digital multimedia reproducing apparatus as claimed in claim 15, wherein the storage unit stores reproducible audio and/or data files.

21. The digital multimedia reproducing apparatus as claimed in claim 15, further comprising:

a display unit to display video data, and an audio output unit to output audio data.

22. A digital multimedia reproducing apparatus reproducing recorded digital broadcasting, the apparatus comprising:

a storage unit to store a digital broadcasting signal in the form of an MPEG-2transmission stream;

a decoding unit to receive the MPEG-2 transmission stream from the storage unit, to demultiplex the MPEG-2 transmission stream, to extract video data and audio data from the MPEG-2 transmission stream, to decode the extracted audio data using bit-sliced arithmetic coding (BSAC) software, and to H.264-decode the video data;

a control unit to decode the extracted audio data using bit-sliced arithmetic coding (BSAC) software and to control the decoded audio data and the video data to be output;

a display unit to display the video data; and an audio output unit to output the decoded audio data.

23. The digital multimedia reproducing apparatus as claimed in claim 22, wherein the decoding unit comprises:

an MPEG-2 demultiplexer to demultiplex the MPEG-2 transmission stream to extract the video data and the audio data;

an H.264 decoder to H.264 decode the video data;

a post to convert a format of the decoded video data into a YUV format;

a display controller to transmit the video data in the YUV format to the control unit;

an internal memory to store the audio data and the video data to be processed by the MPEG-2 demultiplexer, the H.264 decoder, the post, and the display controller; and a direct memory access (DMA) to control access to the internal memory by the MPEG-2 demultiplexer, the H.264 decoder, the post, and the display controller.

24. The digital multimedia reproducing apparatus as claimed in claim 22, wherein the control unit comprises:

a BSAC software to decode the audio data using the BSAC software;

a video interface to receive the video data from the decoding unit and to convert a format of the video data into an RGB format; and an LCD controller to control an output of the video data in the RGB format.

25. The digital multimedia reproducing apparatus as claimed in claim 24, wherein the decoder comprises an H.264 decoder, and the control unit further comprises:

an H.264 controller to control the H.264 decoder;

a TS controller to control the MPEG-2 transmission stream;

a system controller to control the digital multimedia reproducing apparatus; and a memory traffic controller to control access to the storage unit by the BSAC software decoder, the H.264 controller, the TS controller, and the system controller.

26. A digital multimedia reproducing apparatus providing, recording, and reproducing digital broadcasting, the apparatus comprising:

a tuner unit to receive a digital broadcasting signal via a predetermined channel;

a channel decoding unit to convert the digital broadcasting signal received from the tuner unit into a digital signal and to perform OFDM demodulation, Viterbi decoding, and/or Reed Solomon decoding on the digital signal so as to produce an MPEG-2 transmission stream;

a storage unit to store the MPEG-2 transmission stream;

a decoding unit to receive the MPEG-2 transmission stream from the storage unit or the channel decoding unit, to demultiplex the MPEG-2 transmission stream to extract video data and/or audio data, to decode the extracted audio data using bit-sliced arithmetic coding (BSAC) software, and to H.264-decode the video data; and a control unit to control a transmission of the MPEG-2 transmission stream to the storage unit, to decode the extracted audio data, and to control the decoded audio data and the video data to be output.

27. The digital multimedia reproducing apparatus as claimed in claim 26, further comprising:

a display unit to display the video data; and an audio output unit to output the decoded audio data.

28. The digital multimedia reproducing apparatus as claimed in claim 26, wherein the tuner unit converts the digital broadcasting signal from a radio frequency (RF) signal into an intermediate frequency (IF) signal.

29. The digital multimedia reproducing apparatus as claimed in claim 28, wherein the channel decoding unit comprises:

an analog-to-digital converter to convert the IF signal into the digital signal;

an OFDM demodulator to demodulate the digital signal according to an OFDM way and to output a fast information channel (FIC) and a main service channel (MSC);

a time deinterleaver to perform time deinterleaving on the MSC;

a Viterbi decoder to perform Viterbi decoding on the signal output by the time deinterleaver;

a convolution deinterleaver to perform convolution deinterleaving on the Viterbi decoded signal; and a Reed Solomon decoder to perform Reed Solomon decoding on the convolutional deinterleaved signal and to output the MPEG-2 transmission stream.

30. The digital multimedia reproducing apparatus as claimed in claim 26, wherein the decoding unit comprises:

an MPEG-2 demultiplexer to demultiplex the MPEG-2 transmission stream to extract the video data and the audio data;

an H.264 decoder to H.264 decode the video data;

a post to convert a format of the decoded video data into a YUV format;

a display controller to transmit the video data in the YUV format to the control unit;

an internal memory to store the audio data and the video data to be processed by the MPEG-2 demultiplexer, the H.264 decoder, the post, and the display controller; and a direct memory access (DMA) to control access to the internal memory by the MPEG-2 demultiplexer, the H.264 decoder, the post, and the display controller.

31. The digital multimedia reproducing apparatus as claimed in claim 26, wherein the control unit comprises:

a BSAC software decoder to decode the audio data using bit-sliced arithmetic coding (BSAC) software;

a video interface to receive the video data from the decoding unit and to convert a format of the video data into an RGB format; and an LCD controller to control an output of the video data in the RGB format.

32. The digital multimedia reproducing apparatus as claimed in claim 31, wherein the decoder comprises an H.264 decoder, and the control unit further comprises:

a tuner/channel controller to control the tuner unit and the channel decoding unit;

an H.264 controller to control an H.264 decoder comprised in the decoding unit;

a TS controller to control the MPEG-2 transmission stream;

a system controller to control the digital multimedia reproducing apparatus;

a media decoder to decode at least one of an MPEG-4 file, a WMV file, and a DIVX file;

a memory traffic controller to control access to the storage unit by the BSAC software decoder, the tuner/channel controller, the H.264 controller, the TS controller, and the system controller; and a host port interface bridge (HPIB) to provide an interface for the media decoder.

33. The digital multimedia reproducing apparatus as claimed in claim 26, further comprising:

a communications line control unit to control a connection to an external device, wherein the control unit controls the communications line control unit to send a file stored in the storage unit to the external device or to receive a file from the external device.

34. The digital multimedia reproducing apparatus as claimed in claim 26, further comprising a video input/output unit to output the video data or to receive video and/or audio data reproduced by an external apparatus.

35. A method of providing digital broadcasting, the method comprising:

receiving a user input signal that requests the digital broadcasting;

receiving a digital broadcasting signal via a predetermined channel;

converting the received digital broadcasting signal into a digital signal and performing OFDM demodulation, Viterbi decoding, and Reed Solomon decoding on the digital signal to thereby produce an MPEG-2 transmission stream;

demultiplexing the MPEG-2 transmission stream to extract video data and audio data and H.264-decoding the video data;

decoding the extracted audio data using bit-sliced arithmetic coding (BSAC) software; and outputting the decoded audio data and the decoded video data.

36. The method as claimed in claim 35, further comprising:

connecting to an external device; and transmitting a stored file to the external device or receiving a file from the external device.

37. The method as claimed in claim 35, further comprising:

connecting to an external device; and outputting the decoded audio data and the decoded video data to the external device or receiving video and/or audio data reproduced by the external device.

38. The method as claimed in claim 35, further comprising:

transmitting the MPEG-2 transmission stream to a storage unit; and storing the MPEG-2 transmission stream in the storage unit.

39. A method of recording digital broadcasting, the method comprising:

receiving a user input signal that requests recording of the digital broadcasting;

receiving a digital broadcasting signal via a predetermined channel;

converting the received digital broadcasting signal into a digital signal and performing OFDM demodulation, Viterbi decoding, convolution deinterleaving, and Reed Solomon decoding on the digital signal to thereby produce an MPEG-2 transmission stream;

transmitting the MPEG-2 transmission stream to a storage unit; and storing the MPEG-2 transmission stream in the storage unit.

40. The method as claimed in claim 39, further comprising:

receiving the MPEG-2 transmission stream and storing the MPEG-2 transmission stream in an internal memory, wherein the transmitting of the MPEG-2 transmission stream comprising transmitting the MPEG-2 transmission stream from the internal memory to the storage unit.

41. A method of reproducing digital broadcasting, the method comprising:

receiving a user input signal that requests a reproduction of a recorded digital broadcasting signal;

reading a digital broadcasting signal stored in the form of an MPEG-2 transmission stream;

demultiplexing the read MPEG-2 transmission stream to extract video data and/or audio data and to H.264-decode the video data;

decoding the audio data using BSAC software; and outputting the decoded audio data and the decoded video data.

42. A method of providing, recording, and reproducing digital broadcasting, the method comprising:

receiving a digital broadcasting signal via a predetermined channel;

converting the received digital broadcasting signal into a digital signal and performing OFDM demodulation, Viterbi decoding, and Reed Solomon decoding on the digital signal to thereby produce an MPEG-2 transmission stream;

transmitting the MPEG-2 transmission stream to a storage unit;

storing the MPEG-2 transmission stream in the storage unit;

reading the MPEG-2 transmission stream from the storage unit;

demultiplexing the MPEG-2 transmission stream to extract video data and audio data and H.264-decoding the video data;

decoding the extracted audio data using BSAC software; and outputting the decoded audio data and the decoded video data.

43. A non-transitory computer-readable recording medium encoded with the method of claim 35 implemented by a computer.

44. A non-transitory computer-readable recording medium encoded with the method of claim 39 implemented by a computer.

45. A non-transitory computer-readable recording medium encoded with the method of claim 41 implemented by a computer.

46. A non-transitory computer-readable recording medium encoded with the method of claim 42 implemented by a computer.

47. A digital multimedia reproducing apparatus providing, recording, and reproducing digital broadcasting, the apparatus comprising:

a tuner to receive a digital broadcasting signal via a predetermined channel;

a channel decoding unit to convert the digital broadcasting signal received from the tuner unit into a multimedia data transmission stream;

a storage unit to store the multimedia data transmission stream;

a decoding unit to receive the multimedia data transmission stream from the storage unit or the channel decoding unit, to extract video data and/or audio data, to decode the extracted audio data using bit-sliced arithmetic coding (BSAC) software, and to decode the extracted video data; and a control unit to control a transmission of the multimedia data transmission stream to the storage unit, to decode the extracted audio data, and to control the decoded audio data and the video data to be output.

48. A method of providing, recording, and reproducing digital broadcasting, the method comprising:

receiving a digital broadcasting signal via a predetermined channel;

converting the received digital broadcasting signal into a multimedia data transmission stream;

transmitting the multimedia data transmission stream to a storage unit;

storing the multimedia data transmission stream in the storage unit;

reading the multimedia data transmission stream from the storage unit;

extracting video data and audio data from the multimedia data transmission stream;

decoding the extracted video data;

decoding the extracted audio data using bit-sliced arithmetic coding (BSAC) software; and outputting the decoded audio data and the decoded video data.

* * * * *

UNITED STATES PATENT AND TRADEMARK OFFICE

CERTIFICATE OF CORRECTION

PATENT NO. : 8,189,987 B2
APPLICATION NO. : 11/638375
DATED : May 29, 2012
INVENTOR(S) : Hyun-seok Choi et al.

It is certified that error appears in the above-identified patent and that said Letters Patent is hereby corrected as shown below:

Column 11, Line 10 (Approx.), In Claim 4, delete "MPEG-2demultiplexer," and insert -- MPEG-2 demultiplexer, --, therefor.

Column 12, Line 21 (Approx.), In Claim 15, delete "MPEG-2transmission" and insert -- MPEG-2 transmission --, therefor.

Column 13, Line 8, In Claim 22, delete "MPEG-2transmission" and insert -- MPEG-2 transmission --, therefor.

Signed and Sealed this
Thirty-first Day of July, 2012

David J. Kappos
*Director of the United States Patent and Trademark Office*